Patented July 13, 1937

2,087,098

UNITED STATES PATENT OFFICE 2,087,098

ANTIFREEZE SOLUTIONS

Louis Spiegler, Woodbury, and Charles J. Pedersen, Penns Grove, N. J., assignors to E. I. du Pont de Nemours & Company, Wilmington, Del., a corporation of Delaware No Drawing. Application November 30, 1935, Serial No. 52,340

22 Claims. (Cl. 252—5)

This invention relates to liquids suitable for use in heat exchange devices and the like and more particularly to aqueous alcohol solutions for use in automobile radiators.

It is now common practice to employ as cooling media in heat exchange devices, particularly for automobile radiators, aqueous alcohol solutions. One of the more important problems involved in the use of such liquids results from the fact that the alcohol is volatile and forms with water an azeotropic mixture even more volatile than the alcohol or the water. This results in a relatively rapid loss of the alcohol from the liquid with the corresponding loss in the advantageous characteristics of the alcohol.

Several expedients have been employed in an attempt to avoid this loss of valuable alcohol. The most common expedient has been to add to the aqueous alcohol solution a small amount of a high boiling liquid such as aromatic hydrocarbons, petroleum oils, kerosene, vegetable and animal fats and oils and fish oils. These various oily materials form a layer on the upper surface of the alcohol solution which greatly retards the evaporation of the alcohol. While these oils have been fairly satisfactory for their purpose, they have introduced a further problem which has greatly retarded their commercial use.

The usual heat exchange devices, particularly automobile radiators, contain rust produced prior to the addition of the heat exchange liquid which rust is formed by the use of aqueous liquids which cause corrosion. Also, the best of corrosion inhibitors employed in such heat exchange liquids do not prevent all corrosion of the metal of the heat exchanger and hence there is a gradual accumulation of rust in the exchanger. When an oil such as the petroleum oils, kerosene, aromatic hydrocarbons and the like are employed in such aqueous alcohol solution, such oils float the rust to the surface of the liquid as a scum, dispersion or emulsion. Under the conditions of high temperature obtained in such heat exchange devices, this rust in the oil film cakes upon the metallic surfaces of the heat exchanger thereby greatly reducing the efficiency of the heat exchange devices resulting, in the case of automobile radiators, in over-heating.

An object of the present invention is to provide a liquid suitable for use in heat exchange devices which liquid comprises an aqueous alcoholic solution and a material for retarding the loss of alcohol from the solution without causing objectionable flotation of rust and the like. A further object is to provide substances for addition to such aqueous alcoholic heat exchange liquids, employing oily materials which normally float rust, which substances will prevent or inhibit the flotation of the rust by the oily materials. A still further object is to provide a method for producing such liquids. Other objects are to provide new compositions of matter and to advance the art. Still other objects will appear hereinafter.

These objects may be accomplished in accordance with our invention which comprises incorporating, in a volatile water-soluble alcohol, such as ethyl alcohol and methyl alcohol, a small amount of at least one higher alkanol consisting of carbon, hydrogen and oxygen. Such higher alkanol should boil between about 150° C. to about 300° C. and have a specific gravity below that of the solution produced by diluting the water-soluble alcohol with water to contain less than 50% by volume of the water-soluble alcohol. Further, such higher alkanol should be substantially immiscible with the diluted aqueous alcohol solution and be present in an amount sufficient to form a continuous layer upon the upper surfaces of the diluted alcohol solution. We have found that a higher alkanol of such type will greatly retard evaporation of the lower alcohol from the aqueous alcoholic solution and, at the same time, will not carry any substantial amounts of rust to the surfaces of the liquid with it and hence danger of caking of rest on the metal surfaces of the heat exchanger is very greatly eliminated. This appears to be due to the fact that such higher alkanols do not "wet" the rust to any substantial extent and hence do not form dispersions or emulsions of the rust.

The term "alkanol" is employed in its generally understood sense and means the unsubstituted a-cyclic and ali-cyclic alcohols including the terpene alcohols.

We have further found that these higher alkanols can be employed together with the usual oily materials employed for retarding loss of alcohol from such aqueous alcoholic solutions. When such higher alkanols are employed with such oily materials, they reduce the tendency of the oily materials to "wet" the rust and form dispersions, emulsions and the like with the rust. In fact, if three parts of such higher alkanol is employed for each part of oily material, such as kerosene, such alkanol will suppress substantially all tendency of the oily material to "wet" the rust and carry such rust to the surface of the aqueous alcoholic solutions. In practice, from 0.1 to 3 parts by weight of the higher alkanol for each part of the oily material will be employed. Accordingly, while the higher alkanols of our invention may be employed by themselves, we preferably contemplate employing them with the usual oily materials and particularly with kerosene.

Preferably the higher alkanols of our invention, whether alone or in combination with the oily materials, are added to the concentrated volatile alcohol of 188 to 190 proof. Upon dilution of such prepared composition to the desired strength, say from 10 to 41% by volume of volatile alcohol, the composition separates, forming an upper layer containing the higher alkanols and, if present, the oily materials, and a lower layer of the aqueous solution of the volatile alcohol.

The proportion of higher alkanol will vary with the constituents of the diluted aqueous alcoholic solution and the area of the upper surface of such solution. In any event, the amount of higher alkanol or mixture of higher alkanol and oily material must be sufficient to form a continuous layer on the upper surface of the diluted aqueous alcohol solution. Such alcohol may contain any of the usual corrosion inhibitors. Some of such corrosion inhibitors, known as "soluble oils", comprise oils and emulsifying agents to form an emulsion with the aqueous alcohol solution. When such inhibitors are employed, the higher alkanol or the higher alkanol in combination with oily material, to be added to form the upper layer, must be sufficient in amount so that it will not be completely emulsified with the aqueous alcohol solution but must be in sufficient excess to form the desired upper protecting layer. However, the use of such corrosion inhibitors, known as soluble oils, in the compositions of our invention is not recommended as they render it much more difficult to avoid objectionable flotation of the rust.

The higher alkanols which we prefer to employ for our purpose are the mono- and di-cyclic terpene alcohols such as:

Alpha terpineol, beta terpineol, borneol, isoborneol, terpinenol-4, sabinol, sabinene hydrate, thujyl alcohol, myrtenol, pinene hydrate, camphene hydrate, fenchyl alcohol and the like. Of the terpene alcohols, we have found that a mixture, comprising 70 to 75% of the alpha and beta terpineols and about 20-25% of borneol and isoborneol having a boiling range of 204–230° C., a specific gravity of 0.94–0.95 and a flash point at approximately 165° F., is the most satisfactory. Furthermore, pine oil, having a specific gravity of 0.933–0.938, a flash point of 78° C., a boiling range of 190–223° C. and comprising approximately 5 to 10% of terpene hydrocarbons, 5–10% of the corresponding oxides and approximately 70–80% of terpene alcohols comprising alpha terpineol, beta terpineol, fenchyl alcohol and borneol, is particularly satisfactory for our purpose.

Other higher alkanols which have proved to be very satisfactory for our purpose are the monohydric primary aliphatic alcohols of 8 or more carbon atoms. While the individual alcohols may be employed, it is preferred to employ mixtures of such alcohols and particularly the mixtures of alcohols, obtained by the reduction of coconut and like oils, containing at least 10 carbon atoms and boiling between 200 and 260° C. which are sold under the trade name "Lorol". Examples of such alcohols are:

Dodecyl alcohol, octyl alcohol, stearyl alcohol, cetyl alcohol, ceryl alcohol, decyl alcohol, nonyl alcohol, tetradecyl alcohol, oleyl alcohol, lineoleyl alcohol and the like. Other alkanols which may be employed are the secondary alcohols, obtained by the oxidation of petroleum hydrocarbons, and which otherwise have the characteristics required and specified hereinbefore.

The oily materials, which may be employed with our higher alkanols, should have a boiling range of between about 150° C. to about 300° C. and a specific gravity below 0.96 and should be substantially immiscible with the water-soluble alcohol when such alcohol is diluted with water to a concentration of less than 50% by volume. The most effective oily material for our purpose is that which is the poorest solvent for the water-soluble alcohol. The most satisfactory oily materials are the alkanes although some aromatic hydrocarbons may be employed. The term "alkanes" is understood to mean the a-cyclic and ali-cyclic hydrocarbons, including the terpene hydrocarbons. Preferably, the oils comprise aliphatic hydrocarbons and, particularly, mixtures thereof. The preferred mixtures are those generally known as kerosene and similar petroleum distillates.

While some of the alkanols and alkanes within our invention are, when pure, solids at ordinary temperatures, we have found that, when incorporated in the alcohol in accordance with our invention or employed with lower melting alcohols or hydrocarbons, they form a liquid layer on the upper surface of the diluted aqueous alcohol solution. We do not attempt to explain or give any theory for such phenomena.

In order to test the compounds of our invention, mixtures were made comprising 1 to 10 parts of high boiling alcohols, such as octyl, dodecyl and stearyl alcohols, terpineol, pine oil and the like, 100 parts of an aqueous solution containing 10 to 50% by volume of ethyl or methyl alcohol and 0.1 to 0.5 parts of various hydrated and unhydrated oxides of iron, such as haemetite, ferric oxide, ferric hydroxide or ordinary iron rust. Such mixtures were subjected to prolongated boiling with vigorous stirring in an attempt to cause the suspended solids to become emulsified. Upon standing for 5 to 10 seconds, the iron oxides settled leaving a clear oil film free of "scum" upon the upper surface of the aqueous alcohol solution.

When a similar experiment was carried out employing kerosene and other petroleum distillates but in the absence of the high boiling alkanols, an emulsion of rust or iron oxide formed which floated to the surface of the aqueous alcohol solution and did not settle or break after standing for several weeks. On the other hand, when such kerosene or petroleum distillate was employed with one part of the high boiling alkanols for each part of the kerosene or petroleum distillate, in a similar test, the iron oxide or rust rapidly settled, leaving a clear oily layer free of "scum" upon the surface of the aqueous alcohol solution.

An aqueous solution containing 41% by volume of ethyl alcohol was heated at 149° F. for 120 minutes in an open vessel. The total evaporation loss was rated as one (1). A similar alcohol solution, but containing sufficient terpene alcohols to produce a continuous film upon the upper surface thereof, was subjected to the same test. In this case, the evaporation loss was 0.66. A similar test was made employing a mixture of coconut oil alcohols, containing over 10 carbon atoms and having a boiling range of 200–260° C., to produce the oil film on the upper surface of the aqueous alcohol solution. In this case, the evaporation loss was only 0.5.

From all of the above, it will be readily apparent that, in accordance with our invention, the disadvantages of the prior art compositions have been largely cured without sacrificing the various advantages thereof and hence our invention constitutes a valuable contribution to the art. While we have disclosed specific compounds and combinations of compounds, it will be readily apparent that many variations and modifications may be made therein and in the other ingredients to be employed in the heat exchange liquids without departing from the spirit of our invention. Accordingly, the scope of our invention is to be limited solely by the appended claims construed as broadly as is permissible in view of the prior art.

We claim:

1. A liquid suitable for use in heat exchange devices and the like comprising a volatile water-soluble aliphatic alcohol having incorporated therein an evaporation retarder which comprises at least one higher alkanol boiling between about 150° C. and about 300° C. and having a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

2. A liquid suitable for use in heat exchange devices and the like comprising a volatile water-soluble aliphatic alcohol having incorporated therein an evaporation retarder which comprises a mixture of alkanols boiling between about 150° C. and about 300° C. and having a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

3. A liquid suitable for use in heat exchange devices and the like comprising a volatile water-soluble aliphatic alcohol having incorporated therein an evaporation retarder which comprises at least one cyclic terpene alcohol boiling between about 150° C. and about 300° C. and having a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

4. A liquid suitable for use in heat exchange devices and the like comprising a volatile water-soluble aliphatic alcohol having incorporated therein an evaporation retarder which comprises a mixture of cyclic terpene alcohols boiling between about 150° C. and about 300° C. and having a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

5. A liquid suitable for use in heat exchange devices and the like comprising a volatile water-soluble aliphatic alcohol having incorporated therein an evaporation retarder which comprises a mixture of terpene alcohols containing about 70 to about 75% of alpha and beta terpineols and about 20 to about 25% of borneol and isoborneol boiling between about 204 and about 230° C. and having a specific gravity of about 0.94 to 0.95, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

6. A liquid suitable for use in heat exchange devices and the like comprising a volatile water-soluble aliphatic alcohol having incorporated therein an evaporation retarder which comprises an oily material and for each part of oily material at least 0.1 part of at least one alkanol, said oily material and said alkanol boiling between about 150° C. and about 300° C. and having a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

7. A liquid suitable for use in heat exchange devices and the like comprising a volatile water-soluble aliphatic alcohol having incorporated therein an evaporation retarder which comprises at least one alkane and for each part of alkane at least 0.1 parts of at least one alkanol, said alkane and said alkanol boiling between about 150° C. and about 300° C. and having a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

8. A liquid suitable for use in heat exchange devices and the like comprising a volatile water-soluble aliphatic alcohol having incorporated therein an evaporation retarder which comprises a mixture of alkanes and for each part of such mixture at least 0.1 part of a mixture of alkanols, said mixtures of alkanes and alkanols boiling between about 150° C. and about 300° C. and having a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

9. A liquid suitable for use in heat exchange devices and the like comprising a volatile water-soluble aliphatic alcohol having incorporated therein an evaporation retarder which comprises a mixture of alkanes and for each part of such mixture at least 0.1 part of at least one cyclic terpene alcohol, said mixture of alkanes and terpene alcohol boiling between about 150° C. and about 300° C. and having a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

10. A liquid suitable for use in heat exchange devices and the like comprising a volatile water-soluble aliphatic alcohol having incorporated therein an evaporation retarder which comprises a mixture of alkanes and for each part of such mixture at least 0.1 part of a mixture of cyclic terpene alcohols, said mixtures of alkanes and terpene alcohols boiling between about 150° C. and about 300° C. and having a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

11. A liquid suitable for use in heat exchange devices and the like comprising a volatile water-soluble aliphatic alcohol having incorporated therein an evaporation retarder which comprises a hydrocarbon oil and for each part of such oil at least 0.1 part of a mixture of alkanols, said oil and mixture of alkanols boiling between about 150° C. and about 300° C. and having a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

12. A liquid suitable for use in heat exchange devices and the like comprising a volatile water-soluble aliphatic alcohol having incorporated therein an evaporation retarder which comprises a petroleum oil and for each part of such oil at least 0.1 part of at least one alkanol, said oil and alkanol boiling between about 150° C. and about 300° C. and having a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

13. A liquid suitable for use in heat exchange devices and the like comprising a volatile water-soluble aliphatic alcohol having incorporated therein an evaporation retarder which comprises a petroleum oil and for each part of such oil at least 0.1 part of a mixture of alkanols, said oil and mixture of alkanols boiling between about 150° C. and about 300° C. and having a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

14. A liquid suitable for use in heat exchange devices and the like comprising a volatile water-soluble aliphatic alcohol having incorporated therein an evaporation retarder which comprises a petroleum oil and for each part of such oil at least 0.1 part of a mixture of cyclic terpene alcohols, said oil and mixture of terpene alcohols boiling between about 150° C. and about 300° C. and having a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

15. A liquid suitable for use in heat exchange devices and the like comprising a volatile water-soluble aliphatic alcohol having incorporated therein an evaporation retarder which comprises kerosene and for each part of kerosene at least 0.1 part of a mixture of cyclic terpene alcohols, said kerosene and mixture of terpene alcohols boiling between about 150° C. and about 300° C. and having a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

16. A liquid suitable for use in heat exchange devices and the like comprising a volatile water-soluble aliphatic alcohol having incorporated therein an evaporation retarder which comprises kerosene and for each part of kerosene at least 0.1 part of a mixture of terpene alcohols containing about 70 to about 75% of alpha and beta terpineols and about 20 to about 25% of borneol and isoborneol, the kerosene boiling between about 150 to 300° C. and having a specific gravity below 0.96 and the mixture of terpene alcohols boiling between about 204 and about 230° C. and having a specific gravity of about 0.94 to 0.95, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

17. The method of preparing a liquid suitable for use in heat exchange devices and the like which comprises incorporating in a concentrated volatile water-soluble alcohol, in an amount sufficient to form a continuous liquid layer upon the upper surface of the alcohol when diluted with water to contain less than 50% of alcohol by volume, an evaporation inhibitor comprising at least one higher alkanol boiling between about 150° C. to about 300° C. and having a specific gravity below 0.96, said inhibitor being substantially immiscible with the diluted aqueous alcohol solution, and then diluting the resulting composition with water sufficient to form a solution containing less than 50% of the volatile alcohol by volume.

18. The method of preparing a liquid suitable for use in heat exchange devices and the like which comprises incorporating in a concentrated volatile water-soluble alcohol, in an amount sufficient to form a continuous liquid layer upon the upper surface of the alcohol when diluted with water to contain less than 50% of alcohol by volume, an evaporation inhibitor comprising a hydrocarbon oil and for each part of such oil at least 0.1 part of a mixture of alkanols, said oil and mixture of alkanols boiling between about 150° C. to about 300° C. and having a specific gravity below 0.96, said inhibitor being substantially immiscible with the diluted aqueous alcohol solution, and then diluting the resulting composition with water sufficient to form a solution containing less than 50% of the volatile alcohol by volume.

19. A liquid suitable for use in heat exchange devices and the like comprising a volatile water-soluble aliphatic alcohol having incorporated therein an evaporation retarder which comprises a mixture of secondary alcohols obtained by the oxidation of petroleum hydrocarbons which alcohols boil between about 150° C. and about 300° C. and have a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

20. A liquid suitable for use in heat exchange devices and the like comprising a volatile water-soluble aliphatic alcohol having incorporated therein an evaporation retarder which comprises a mixture of alcohols containing at least 10 carbon atoms obtained by the reduction of coconut and like oils which alcohols boil between about 200° C. and about 260° C. and have a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

21. A liquid suitable for use in heat exchange devices and the like comprising a volatile water-soluble aliphatic alcohol having incorporated therein an evaporation retarder which comprises a petroleum oil and for each part of such oil at least 0.1 part of a mixture of secondary alcohols obtained by the oxidation of petroleum hydrocarbons which alcohols boil between about 150° C. and about 300° C., said oil and mixture of alcohols boiling between about 150° C. and about 300° C. and having a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

22. A liquid suitable for use in heat exchange devices and the like comprising a volatile water-soluble aliphatic alcohol having incorporated therein an evaporation retarder which comprises a petroleum oil and for each part of such oil at least 0.1 part of a mixture of alcohols containing at least 10 carbon atoms obtained by the reduction of coconut and like oils which alcohols boil between about 200° C. and about 260° C., said oil and mixture of alcohols boiling between about 150° C. and about 300° C. and having a specific gravity below 0.96, said evaporation retarder being present in an amount sufficient to form a continuous liquid layer on the upper surface of an aqueous solution containing the same amount of the volatile alcohol in a concentration of less than 50% by volume and being substantially immiscible with such volatile alcohol in such aqueous solution.

LOUIS SPIEGLER.
CHARLES J. PEDERSEN.